(12) United States Patent
Ketterer et al.

(10) Patent No.: US 6,487,769 B2
(45) Date of Patent: Dec. 3, 2002

(54) METHOD AND APPARATUS FOR CONSTRUCTING A SEGMENTED STATOR

(75) Inventors: Charles P. Ketterer, Fenton, MO (US); Donald J. Williams, Pierron, IL (US); Raymond D. Heilman, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 190 days.

(21) Appl. No.: 09/726,975

(22) Filed: Nov. 30, 2000

(65) Prior Publication Data

US 2002/0062548 A1 May 30, 2002

(51) Int. Cl.$^7$ ............................................. H02K 15/03
(52) U.S. Cl. ......................................... 29/596; 29/744
(58) Field of Search ........................ 29/596, 598, 597, 29/607, 732, 744, 736, 606; 310/46, 154.01, 154.12, 156.01, 156.12, 154.03, 154.16, 154.18, 156.11

(56) References Cited

U.S. PATENT DOCUMENTS

| | | |
|---|---|---|
| 1,756,672 A | 4/1930 | Barr |
| 2,688,103 A | 8/1954 | Sheldon |
| 3,979,821 A | 9/1976 | Noodleman |
| 3,987,324 A | 10/1976 | Linkous |
| 4,149,309 A | 4/1979 | Mitsui |
| 4,418,307 A | 11/1983 | Hoffmann et al. |
| 4,584,495 A | 4/1986 | Kordik |
| 4,819,460 A | 4/1989 | Obradovic |
| 4,845,837 A | 7/1989 | Lloyd |
| 4,922,165 A | 5/1990 | Crawford et al. |
| 4,953,284 A | 9/1990 | Hammer et al. |
| 4,998,052 A | 3/1991 | Erdman et al. |

(List continued on next page.)

FOREIGN PATENT DOCUMENTS

| | | |
|---|---|---|
| DE | 2937838 A | 4/1981 |
| JP | 404049826 A | 2/1992 |
| RU | 1354338 | 11/1987 |
| WO | WO 01/95459 A1 | 12/2001 |

OTHER PUBLICATIONS

Anthony J. Champagne, "Correlation of Electric Power Steering Vibration to Subjective Ratings", Mar. 6–9, 2000, SAE Technical Paper Series 200–01–0176, pp. 1–3.
Gallegos–Lopez/Kjaer/Miller, "A New Sensorless Method For Switched Reluctance Motor Drives", 1997, Department of Eletronics and Electrical Engineering, pp. 564–570.
Mvungi/Stephenson, "Accurate Sensorless Rotor Position Detection In An SR Motor", 1991, pp. 76–79.
Roy McCann, "Variable Effort Steering for Vehicle Stability Enhancement Using an Eletric Power Steering System", Mar. 6–9, 2000, SAE Technical Paper Series 2000–01–0817, pp. 1–5.
Toboldt/Johnson/Olive, "Goodheart–Wilcox Automotive Encyclopedia", 1989, pp. 577–584.

Primary Examiner—David P. Bryant
Assistant Examiner—Stephen Kenny
(74) Attorney, Agent, or Firm—Harness, Dickey & Pierce, P.L.C.

(57) ABSTRACT

Methods and apparatus are disclosed for assembling an electric machine. The electric machine includes a plurality of stator segment assemblies that are mounted inside of a housing of an electric machine. The stator segment assemblies are positioned around an outer surface of an assembly fixture. The stator segment assemblies are held to the assembly fixture using a magnetic field that is generated by the assembly fixture. The housing is press fit or hot dropped over the stator segment assemblies. If the housing is hot dropped, the housing is heated to cause the housing to expand. The housing is positioned over the stator segment assemblies while the housing is hot. The housing cools and contracts around the stator segment assemblies to form an interference fit with the stator segment assemblies and then the stator and the housing are removed from the assembly fixture.

23 Claims, 4 Drawing Sheets

U.S. PATENT DOCUMENTS

| | | | |
|---|---|---|---|
| 5,034,642 | A | 7/1991 | Hoemann et al. |
| 5,076,076 | A | 12/1991 | Payne |
| 5,161,393 | A | 11/1992 | Payne et al. |
| 5,194,775 | A | 3/1993 | Cooper |
| 5,212,419 | A | 5/1993 | Fisher et al. |
| 5,252,902 | A | 10/1993 | Uehara et al. |
| 5,256,926 | A | 10/1993 | Hagenlocher et al. |
| 5,301,523 | A | 4/1994 | Payne et al. |
| 5,325,677 | A | 7/1994 | Payne et al. |
| 5,457,375 | A | 10/1995 | Marcinkiewicz et al. |
| 5,467,025 | A | 11/1995 | Ray |
| 5,491,859 | A | 2/1996 | Richardson |
| 5,563,463 | A | 10/1996 | Stark |
| 5,583,387 | A | 12/1996 | Takeuchi et al. |
| 5,589,751 | A | 12/1996 | Lim |
| 5,592,731 | A * | 1/1997 | Huang et al. ................ 29/596 |
| 5,701,064 | A | 12/1997 | Horst et al. |
| 5,720,065 | A | 2/1998 | Myers et al. |
| 5,729,072 | A | 3/1998 | Hirano et al. |
| 5,763,978 | A | 6/1998 | Uchida et al. |
| 5,777,416 | A | 7/1998 | Kolomeitsev |
| 5,786,651 | A | 7/1998 | Suzuki |
| 5,793,179 | A | 8/1998 | Watkins |
| 5,859,518 | A | 1/1999 | Vitunic |
| 5,874,794 | A * | 2/1999 | Trammell et al. ............ 29/596 |
| 5,883,485 | A | 3/1999 | Mehlhorn |
| 5,923,141 | A | 7/1999 | McHugh |
| 5,929,590 | A | 7/1999 | Tang |
| 5,955,861 | A | 9/1999 | Jeong et al. |
| 5,979,195 | A | 11/1999 | Bestell et al. |
| 5,982,117 | A | 11/1999 | Taylor et al. |
| 5,990,592 | A | 11/1999 | Miura et al. |
| 5,996,379 | A | 12/1999 | Skrippek |
| 6,011,368 | A | 1/2000 | Kalpathi et al. |
| 6,020,661 | A | 2/2000 | Trago et al. |
| 6,040,647 | A | 3/2000 | Brown et al. |
| 6,049,153 | A | 4/2000 | Nishiyama et al. |
| 6,081,083 | A | 6/2000 | Nashiki |
| 6,092,619 | A | 7/2000 | Nishikawa et al. |
| 6,102,151 | A | 8/2000 | Shimizu et al. |
| 6,107,772 | A | 8/2000 | Liu et al. |
| 6,122,579 | A | 9/2000 | Collier-Hallman et al. |
| 6,127,753 | A | 10/2000 | Yamazaki et al. |
| 6,144,131 | A | 11/2000 | Hollenbeck et al. |
| 6,188,196 | B1 | 2/2001 | Koide et al. |
| 6,204,579 | B1 | 3/2001 | Arpino |
| 6,218,753 | B1 | 4/2001 | Asano et al. |
| 6,219,900 | B1 | 4/2001 | Suzuki |
| 6,226,856 | B1 | 5/2001 | Kazama et al. |
| 6,300,700 | B1 | 10/2001 | Nishiyama et al. |

* cited by examiner

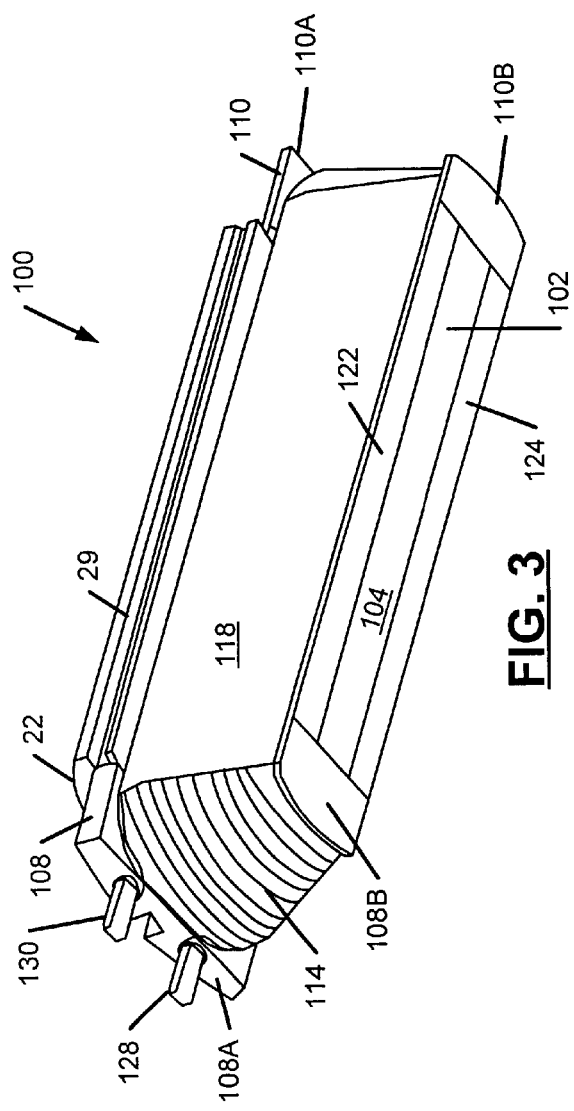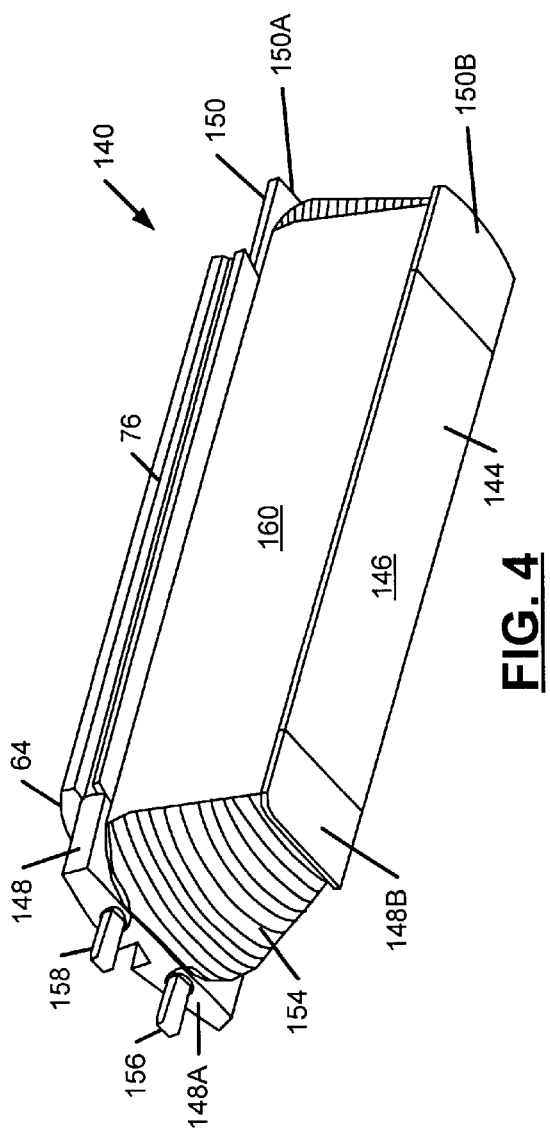

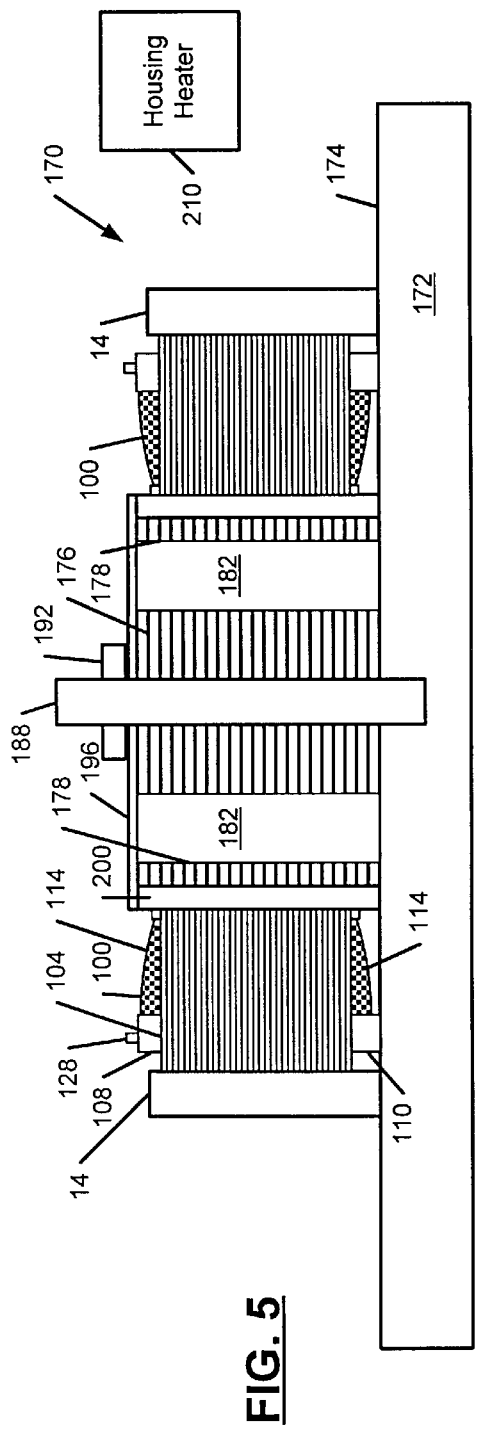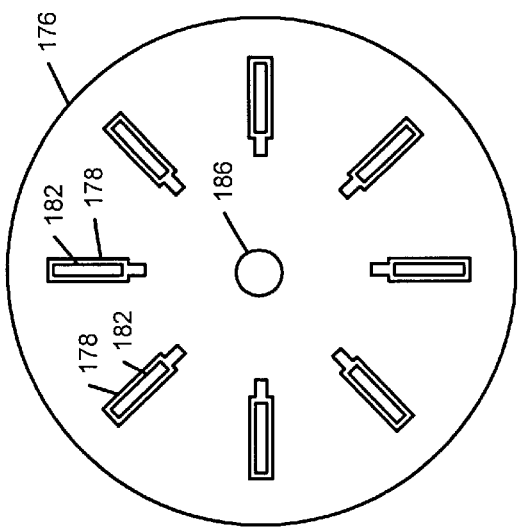
FIG. 5
FIG. 6

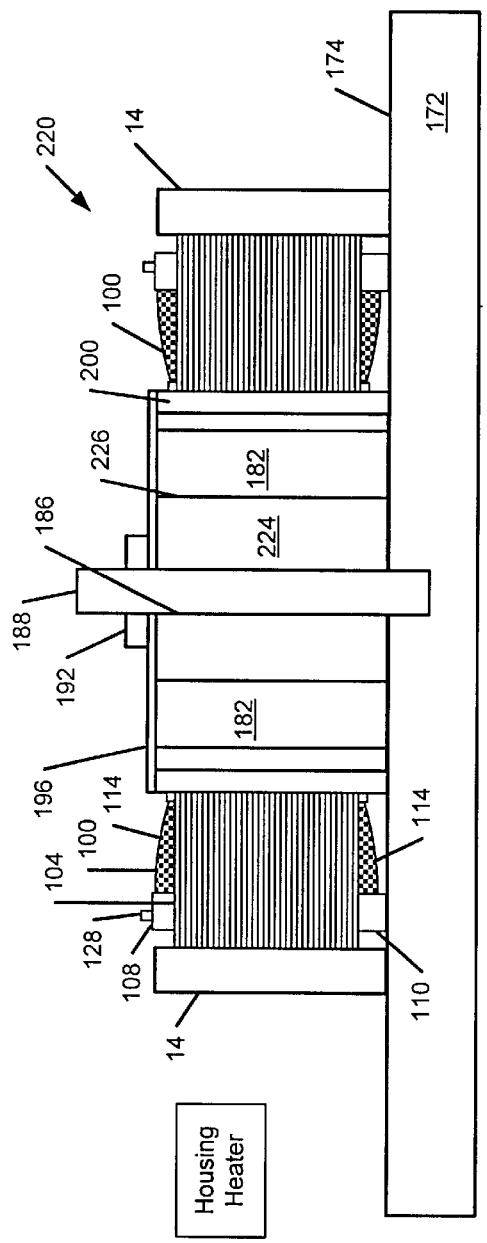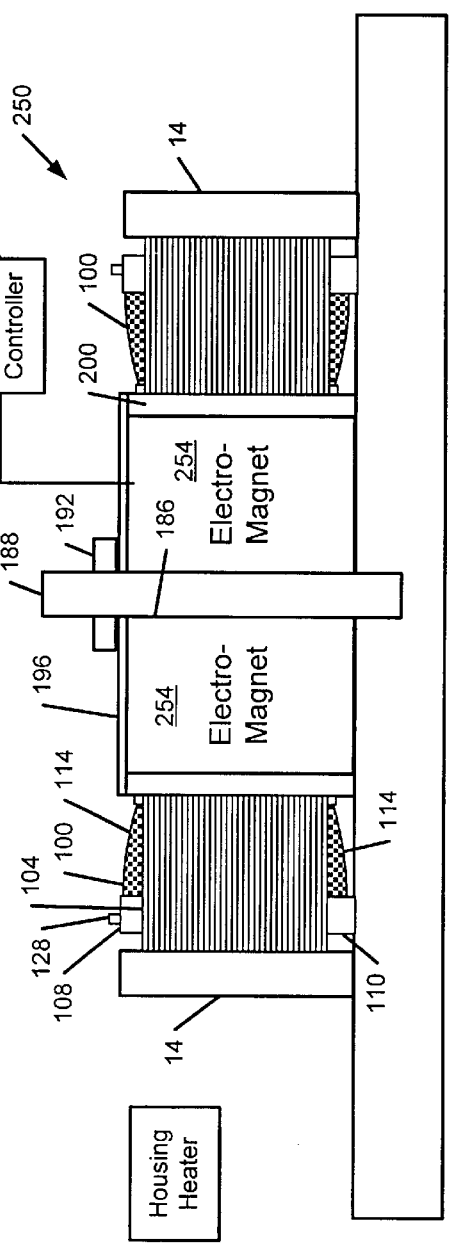

METHOD AND APPARATUS FOR CONSTRUCTING A SEGMENTED STATOR

FIELD OF THE INVENTION

This invention relates to electric machines and, more particularly to methods and apparatus for assembling a segmented stator for an electric machine.

BACKGROUND OF THE INVENTION

Electric machines, such as motors and generators, generally include the same basic component parts. A motor housing encloses a stator and a rotor. Endbells position the rotor relative to the stator. The stator includes salient poles and slots between the salient poles. Winding wire is wound around the stator poles. A drive circuit is connected to the windings and generates a rotating magnetic field in the windings. The rotor includes rotor poles and rotates relative to the housing, the endbells and the stator due to the rotating magnetic field.

Improvements to the design of electric machines have led to more compact machines for a given torque output at reduced assembly costs. If the product is equipped with a motor that does not require additional torque, the outer dimensions of the motor and the product can be reduced without impacting performance. Alternately, the dimensions of the product can be kept the same with a motor providing increased torque and improved performance.

The torque density of machines has been improved through the use of improved magnets on the rotors, stators including segmented stator assemblies, increased slot fill, improved placement of the windings on the segmented stator, and optimized thermal dissipation. In addition to the design and material changes, the assembly processes have also improved.

Part of the assembly process for electric machines having a segmented stator involves securing stator segment assemblies to an inner wall of the housing. In the "hot drop" process, the housing is heated and expands slightly. Expansion of the housing provides sufficient clearance to position the stator segment assemblies inside of the housing. After the housing is placed over the stator segment assemblies, the housing cools and contracts to establish an interference fit between the stator segment assemblies and the housing. In an alternate assembly process, the stator segment assemblies are press fit into the housing. Since the segmented stator typically includes several stator segment assemblies, it is difficult to hold the stator segment assemblies in position while the housing is hot dropped.

Complex assembly fixtures have been devised to locate and hold the stator segment assemblies while the housing is installed. The assembly fixture is often located on the radially outer surface of the stator segment assemblies and obstructs the placement of the housing during assembly. Other assembly techniques employ wires and/or springs to hold the individual stator segment assemblies together while the housing is installed. Oftentimes, the wire and springs fall off during this process which slows the assembly process and adversely impacts quality.

To decrease the time and cost that is required to assemble the electric machines, it is desirable to further improve the assembly process of segmented stator assemblies for electric machines.

SUMMARY OF THE INVENTION

A method of assembling a stator including a plurality of stator segment assemblies inside a housing of an electric machine according to the invention includes the step of positioning the stator segment assemblies around an outer surface of an assembly fixture. The stator segment assemblies are held against the assembly fixture using a magnetic field. The housing is then positioned over the stator segment assemblies. Thereafter, the housing with the stator secured thereto is removed from the assembly fixture.

In other features of the invention, the housing is heated to cause the housing to expand before the housing is positioned over the stator segment assemblies. Afterwards, the housing is allowed to cool and contract around the stator segment assemblies.

According to another feature of the invention, the assembly fixture has a generally cylindrical outer surface. The assembly fixture includes a magnet positioner and a plurality of permanent magnets that are held by the magnet positioner. The assembly fixture generates a magnetic field that has a radial magnetic field component that is higher than an axial magnetic field component. The higher radial magnetic field component holds the stator segments during assembly and the lower axial magnetic field component allow easy removal.

An assembly system for manufacturing a stator with a plurality of stator segment assemblies inside a housing of electric machine includes an assembly fixture that generates a magnetic field. A heater heats and expands the housing. The stator segment assemblies are positioned and held in place around the assembly fixture by the magnetic field while the heated and expanded housing is hot dropped over the stator segment assemblies. The housing cools and contracts to provide an interference fit between the stator segment assemblies and the housing.

In other features of the invention, the assembly fixture includes a cylindrical portion that is connected to a base. A sleeve is positioned on an outer surface of the cylindrical portion of the assembly fixture. The cylindrical portion includes a plurality of circular stacked laminations. Each of the stacked laminations includes a plurality of radial slots. The radial slots of the laminations are aligned and receive permanent magnets. Alternately, the assembly fixture includes an electromagnet that generates the magnetic field.

Other objects, features and advantages will be apparent from the specification, the drawings and the following claims.

BRIEF DESCRIPTION OF THE DRAWINGS

FIG. 3 is a perspective view of a stator segment assembly for the switched reluctance electric machine of FIG. 1;

FIG. 4 is a perspective view of a stator segment assembly for the brushless permanent magnet electric machine of FIG. 2;

FIG. 5 is a sectional view of an electric machine assembly apparatus according to the invention;

FIG. 6 is a plan view of a lamination that is employed by the electric machine assembly apparatus of FIG. 5;

FIG. 7 is a sectional view of a second electric machine assembly apparatus; and

FIG. 8 is a sectional view of a third electric machine assembly apparatus that includes an electromagnet.

DETAILED DESCRIPTION OF THE PREFERRED EMBODIMENTS

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

The present invention discloses methods and corresponding apparatuses for assembling a segmented stator inside a housing of an electric machine. The stator includes of plurality stator segment assemblies that are positioned around an outer surface of an electric machine assembly fixture. The stator segment assemblies are held in place by a magnetic field that is generated by the electric machine assembly fixture. The housing is positioned over the stator segment assemblies and forms an interference fit with the housing. The housing and the segmented stator are then removed from the assembly fixture. In one embodiment, the housing is press fit over the stator segment assemblies. In an alternate embodiment, the housing is heated to cause the housing to expand before the housing is positioned over the stator segment assemblies. After the housing is positioned over the stator segment assemblies, the housing is allowed to cool.

Figure 1:
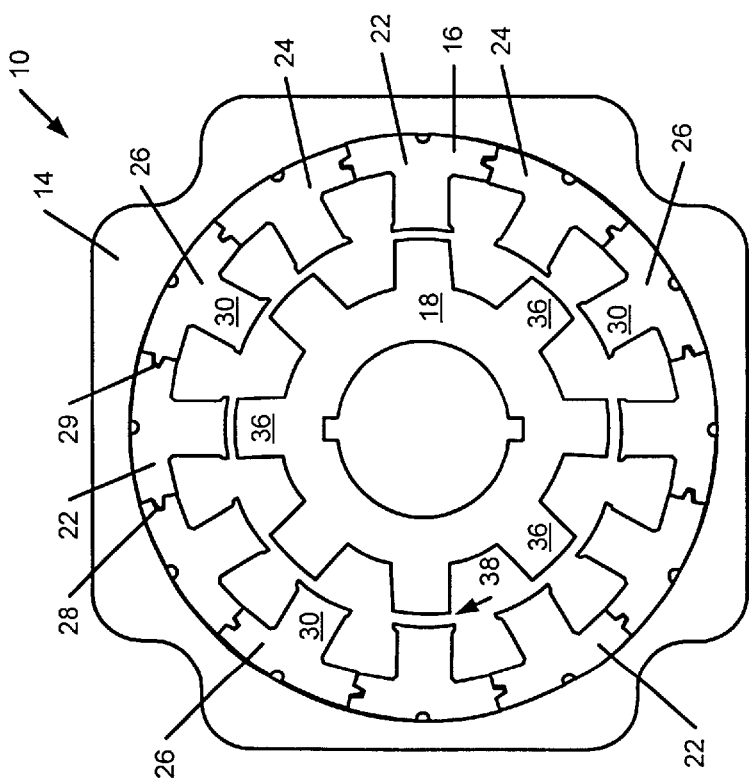
FIG. 1 is a sectional view of a switched reluctance electric machine including a housing, a segmented stator and a rotor.

Referring now to FIG. 1, a switched reluctance electric machine 10 such as a motor or a generator is illustrated and includes a housing 14, a segmented stator 16 and a rotor 18. The segmented stator 16 includes a plurality of stator segment assemblies each including a stack of stator plates forming a stator segment core, end caps with end cap retainer sections, winding wire and an insulating material. For purposes of clarity, FIG. 1 shows only the stator segment cores 22.

The stator segment cores 22 include a stack of connected stator plates 24. Each stator plate 24 of the stator segment core 22 is generally "T"-shaped and includes an outer arcuate rim section 26 and a tooth-shaped pole section 30. The stator plates 24 of the stator segment core 22 include a tongue 28 and a groove 29 on opposite circumferential sides of the rim section 26. The tongues 28 and the grooves 29 of adjacent stator segment assemblies form an interlocking arrangement inside of the housing 14. Windings (not shown) are wound around pole sections 30 of the stator segment core 22.

The rotor 18 includes a plurality of salient rotor poles 36 that extend in a radially outward direction from the rotor 18. An air gap 38 is defined between a radially inner end surface of the stator pole sections 30 and a radially outer end surface of the salient rotor poles 36. A drive circuit (not shown) generates a rotating magnetic field in the windings. A rotor position transducer (RPT) (not shown) generates a rotor position signal that is output to the drive circuit. Alternately, the RPT can be omitted if sensorless methods of sensing rotor position are employed.

Figure 2:
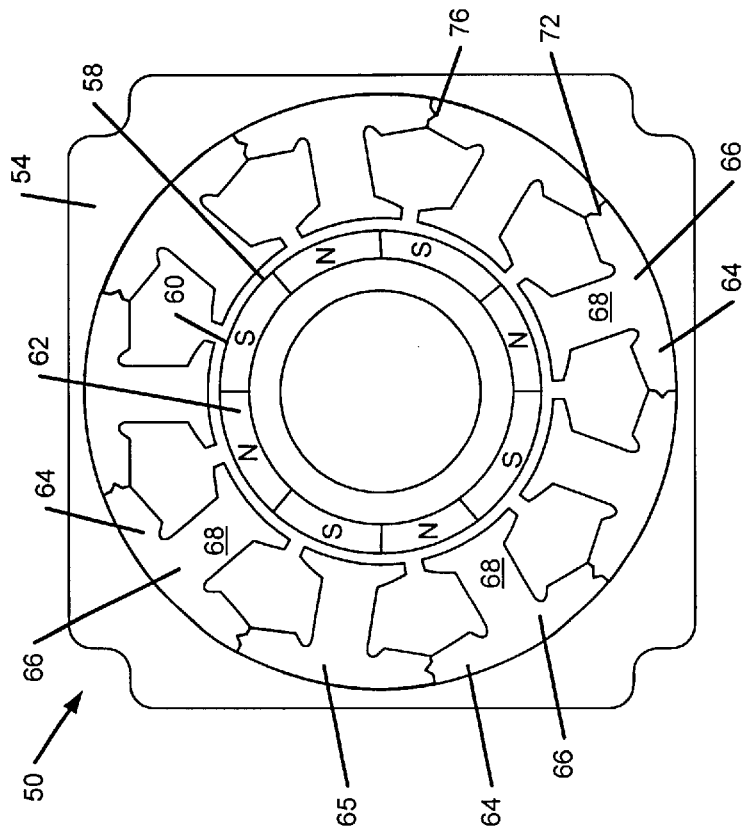
FIG. 2 is a sectional view of a brushless permanent magnet electric machine including a housing, a segmented stator and a rotor.

Referring now the FIG. 2, a brushless permanent magnet electric machine 50 such as a motor or generator is illustrated and includes a housing 54, a segmented stator 56 and a rotor 58. An outer surface 60 of the rotor 58 includes a plurality of permanent magnets 62. As with FIG. 1, the segmented stator 56 includes a plurality of stator segment assemblies each including a stack of stator plates forming a stator segment core, end caps, winding wire and an insulating material. For purposes of clarity, FIG. 2 shows only the stator segment cores 64.

A stack of stator plates 65 forms the segmented stator cores 64. The stator plates 65 include an outer arcuate rim section 66 and a tooth-shaped pole section 68. The stator plates 65 include a tongue 72 and a groove 76 on opposite ends of the rim section 66. The tongues 72 and the grooves 76 of adjacent stator segment assemblies form an interlocking arrangement.

Referring now to FIGS. 1 and 2, the tongues 28 and 72 and the grooves 29 and 76 can have a "V"-shaped cross-section, an arcuate or "C"-shaped cross-section, a trapezoidal cross-section or any other suitable cross-section that will provide an interlocking relationship. During assembly, the stator segment assemblies of the electric machines 10 and 50 are arranged such that their outer surfaces create an interference fit with an inner surface of the housings 14 and 54. As can be appreciated, it is difficult to maintain the stator segment assemblies in the correct position while positioning and assembling the electric machines 10 and 50.

Referring now to FIG. 3, the stator segment cores 22 of FIG. 1 form part of a stator segment assembly 100. The stator segment core 22 includes a stack 102 of the stator plates 24. First and second end caps 108 and 110 are connected to opposite face surfaces of the stator segment cores 22 using adhesive or any other suitable attachment method. The first and second end caps 108 and 110 include radially outer sections 108A and 110A and radially inner sections 108B and 110B. The first and second end caps 108 and 110 also include hub sections (not shown) that connect the radially outer sections 108A and 110A and the radially inner sections 108B and 110B adjacent to the stator pole sections 30. Winding wire 114 is wound around the stator segment cores 22 and the hub sections of the first and second end caps 108 and 110.

An insulating material 118 is positioned between the winding wire 114 and the pole sections 30 of the stator plates 65 on both sides of the stator segment core 22. The insulating material 118 is also positioned to cover an outer surface of the winding wires 114 on both sides of each stator segment assembly 100. The radially inner sections 108B and 110B of the first and second end caps 108 and 110 are connected to each other by a pair of laterally-spaced retainer sections 122 and 124. The retainer sections 122 and 124 extend along opposite sides of the stator pole sections 30 adjacent to circumferential projections of radially inner ends of the stator pole sections 30. The first and second end caps 108 and 110 and the retainer sections 122 and 124 provide an annular retention surface that prevents winding creep and helps maintain the winding wire 114 around the stator segment cores 22 during assembly and use.

One end of the winding wire 114 is connected to a terminal 128 that extends in an axial direction from the first end cap 108. A second terminal 130 likewise extends in an axial direction from the first end cap 108 and is connected to an opposite end of the winding wire 114. A circuit board (not shown), wire or another connection device connects the terminals 128 and 130 of each stator segment assembly 100 to the drive circuit (not shown) that generates the rotating magnetic field.

Referring now to FIG. 4, the stator segment cores 64 of FIG. 2 form part of a stator segment assembly 140. The stator segment cores 64 each include a stack 146 of stator plates 65. First and second end caps 148 and 150 are connected to opposite face surfaces of the stator segment cores 64. The first and second end caps 148 and 150 include radially outer sections 148A and 150A and radially inner sections 148B and 150B. The first and second end caps 148 and 150 also include hub sections (not shown) that connect the radially outer sections 148A and 150A and the radially inner sections 148B and 150B adjacent to the stator pole sections 68. Winding wire 154 is wound around the first and second end caps 148 and 150 and the stator segment core 64. One end of the winding wire 154 is connected to a terminal 156 that projects in an axial direction from first end cap 148. A second terminal 158 projects axially from the first end cap 148 and is connected to an opposite end of the winding wire 154. An insulating material 160 is located between the winding wire 154 and the stator segment core 64. The insulating material 160 also covers an outer surface of the winding wire 154 on both sides of each stator segment assembly 140.

Referring now to FIGS. 5 and 6, an electric machine assembly fixture 170 for assembling stator segment assemblies 100 and 140 is illustrated. While FIGS. 5, 7 and 8 will be described in conjunction with stator segment assemblies 100, it will be appreciated by skilled artisans that the stator segment assemblies 140 are also assembled using the electric machine assembly fixture 170.

The electric machine assembly fixture 170 includes a base 172 having an upper surface 174 providing an alignment surface for the stator segment assemblies 100 and the housing 14. The electric machine assembly fixture 170 includes a stack of circular laminations 176. The laminations 176 include radial slots 178 for receiving permanent magnets 182. In a preferred mode, the laminations are 0.020" thick and are made of M19. The laminations 176 also include a center bore 186 for receiving a shaft 188 that is mounted in the base 172. The shaft 188 includes threads on an outer surface thereof or other suitable fasteners. A nut fastener 192 and a cover plate 196 retain the stack of laminations 176 against the upper surface 174. An outer sleeve 200 that is made of non-magnetic material is positioned around an outer surface of the stack of laminations 176. In a preferred embodiment, the outer sleeve 200 and cover plate 196 are made of polypropylene plastic such as Delron®.

In use, a plurality of stator segment assemblies 100 are positioned around an outer cylindrical wall surface of the sleeve 200 and interlocked (via the tongue and groove connection). A magnetic field that is generated by the magnets 182 retains the stator segment assemblies 100 against the outer cylindrical wall surface. In one embodiment, the housing is press fit over the stator segment assemblies. In another embodiment, a housing heater 210, such as a furnace or other suitable heating mechanism, raises the temperature of the housings 14. Because the housings 14 are made of metal, the housings 14 expand slightly as they are heated. The heated housing 14 is "hot dropped" over the stator segment assemblies 100. As the housing 14 cools, it contracts and forms an interference fit with outer surfaces of the stator segment assemblies 100.

The design of the electric machine assembly fixture 170 provides a magnetic field having a radial field component that is greater than its axial field component. As a result, the radial field component holding the stator segment assemblies 100 during assembly is sufficient to maintain them against the outer surface of the sleeve 200. The housing 14 with the segmented stator 16 secured thereto can be readily removed from the assembly fixture 170 after assembly due to the lower axial field component of the magnetic field.

Referring now to FIG. 7, an alternate assembly fixture 220 is illustrated. Reference numerals from FIG. 5 have been used where appropriate to indicate similar elements. Instead of employing a stack of laminations 176, a solid cylindrical core 224 is utilized. The solid cylindrical core 224 has a similar cross section to that of the stack of laminations 176. Axial slots 226 receive the magnets 182. Operation of the assembly fixture 220 is similar to that of the assembly fixture 170 in that a magnetic field locates and retains the stator segment assemblies 100 in proper alignment during the hot drop installation of the housing 14.

Referring now to FIG. 8, a third assembly fixture 250 is illustrated. A cylindrical electromagnet 254 generates a magnetic field. An electromagnet controller 256 turns the electromagnet 254 on and off. The stator segment assemblies 100 can be inserted onto the assembly fixture 250 with the electromagnet 254 on or off. Once assembled, the electromagnet 254 is turned off for easy removal.

Each method and apparatus disclosed for constructing a segmented stator according to the invention eliminates many of the problems that are associated with the assembly of the segmented stator. The magnetic field that is generated by the assembly fixture eliminates the wire and springs that were previously used to hold the stator segment assemblies together. The assembly fixture also eliminates any fixtures on the outer surface of the stator segments to prevent obstruction of the housing during assembly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of assembling a stator including a plurality of stator segment assemblies inside of a housing of an electric machine comprising the steps of:

positioning said stator segment assemblies around an outer surface of an assembly fixture;

holding said stator segment assemblies to said assembly fixture using a magnetic field;

positioning said housing over said stator segment assemblies; and removing said stator and said housing from said assembly fixture.

2. The method of claim 1 wherein said housing and said stator segment assemblies are held together by an interference fit.

3. The method of claim 1 further comprising the steps of:

heating said housing to cause said housing to expand;

positioning said housing over said stator segment assemblies while said housing is hot; and allowing said housing to cool and contract around said stator segment assemblies.

4. The method of claim 1 wherein said assembly fixture has a generally cylindrical outer surface.

5. The method of claim 4 wherein said assembly fixture includes a magnet positioner and a plurality of permanent magnets held by said magnet positioner.

6. The method of claim 1 further comprising the steps of:

generating a magnetic field having a radial magnetic component that is higher than an axial magnetic component.

7. The method of claim 1 wherein said assembly fixture includes an electromagnet.

8. The method of claim 7 further comprising the steps of:
turning said electromagnet off while positioning said stator segment assemblies on said assembly fixture.

9. The method of claim 8 further comprising the step of:
turning said electromagnet on before hot dropping said housing on said stator segment assemblies.

10. The method of claim 7 further comprising the step of:
turning said electromagnet off before removing said housing and said stator segment assemblies from said assembly fixture.

11. The method of claim 1 further comprising the step of:
positioning a sleeve between said stator segment assemblies and said assembly fixture.

12. The method of claim 1 wherein said stator segment assemblies include a stator segment core with a stack of stator plates.

13. An assembly fixture for assembling a stator with a plurality of stator segment assemblies inside a housing, comprising:
a base; and
a cylindrical core that generates a magnetic field, wherein said stator segment assemblies are positioned and held in place around said cylindrical core by said magnetic field while said housing is fit over said stator segment assemblies.

14. The assembly fixture of claim 13 wherein said housing and said stator segment assemblies are held together by an interference fit.

15. The assembly fixture of claim 13 further comprising:
a heater for heating and expanding said housings wherein said housing is positioned over said stator segment assemblies while said housing is hot.

16. The assembly fixture of claim 13 further comprising:
a sleeve positioned on an outer surface of said cylindrical core of said assembly fixture.

17. The assembly fixture of claim 13 wherein said cylindrical core of said assembly fixture includes a plurality of circular stacked laminations.

18. The assembly fixture of claim 17 wherein each of said circular stacked laminations include a plurality of radial slots and wherein said radial slots on said laminations are aligned.

19. The assembly fixture of claim 18 further comprising:
a plurality of permanent magnets positioned in said plurality of radial slots.

20. The assembly fixture of claim 13 wherein said cylindrical is solid and includes radial slots that extend in an axial direction and a plurality of permanent magnets located in said radial slots.

21. The assembly fixture of claim 17 further comprising:
a fastening device for attaching said cylindrical core and said sleeve to said base.

22. The assembly fixture of claim 21 wherein said laminations include a center bore and said fastening device includes a threaded shaft received by said center bore, a washer and a nut.

23. The assembly fixture of claim 13 wherein said cylindrical core is an electromagnet.

* * * * *